March 29, 1960 C. KUEHNE 2,930,895
SCALE INTERPOLATING DEVICE
Filed Sept. 16, 1958 2 Sheets-Sheet 1

INVENTOR
Christoph Kuehne

By: Samuel W. Kipnis
Atty.

INVENTOR
Christoph Kuehne
By: Samuel W. Kipnis
Atty.

United States Patent Office 2,930,895
Patented Mar. 29, 1960

2,930,895

SCALE INTERPOLATING DEVICE

Christoph Kuehne, Berlin-Zehlendorf, Germany, assignor to Askania-Werke A.G., Berlin-Friedenau, Germany, a corporation of Germany Application September 16, 1958, Serial No. 761,319

Claims priority, application Germany September 23, 1957

4 Claims. (Cl. 250—209)

This invention relates to a device for determining, with the aid of automatic interpolation between measurable values, the position of a scale such for instance as the horizontal or vertical circle of a theodolite or other instrument for measuring angles.

A variety of devices are known wherein the image of a scale dividing mark, displaced relative to a reading index, is converted into an oscillation which is impressed upon a receiver element, for the purpose of deriving a regulating impulse or signal for the control of some mechanism, flow system or the like.

It has now been realized that an improved scale interpolating device can be constructed by similar conversion and use of graduation mark images, in a way such as to enhance the effectiveness of angle measuring instruments; and it is accordingly the object hereof to provide such a device.

Figure 1:
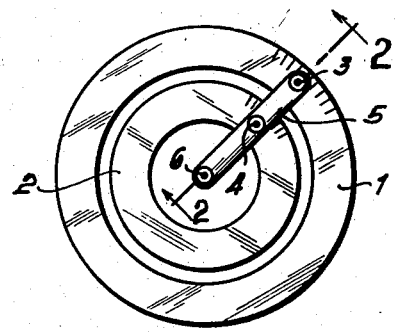
Figure 2:
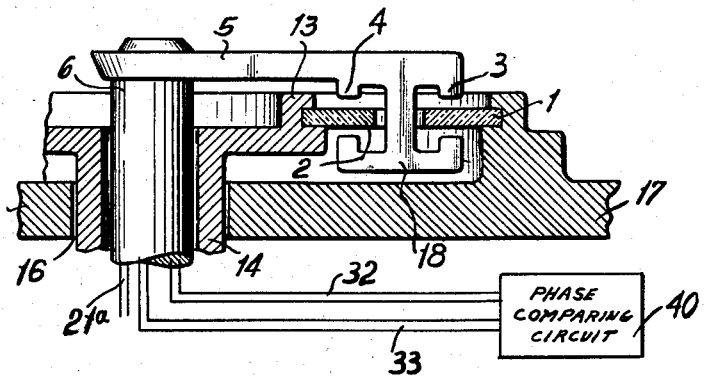
Figure 3:
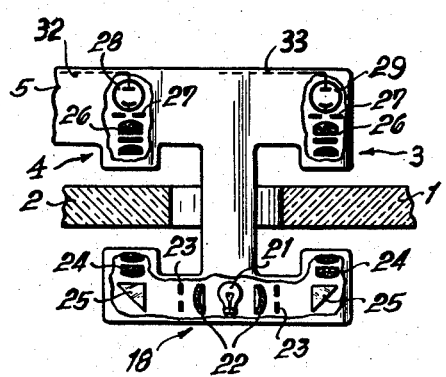
Figure 4:
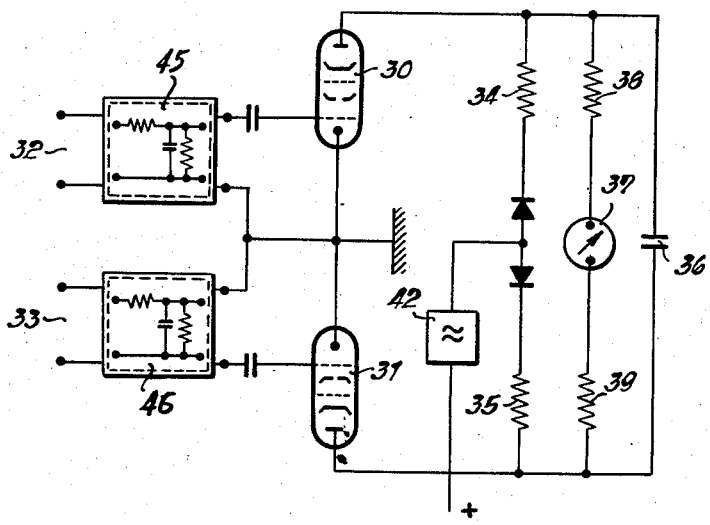
Figure 5:
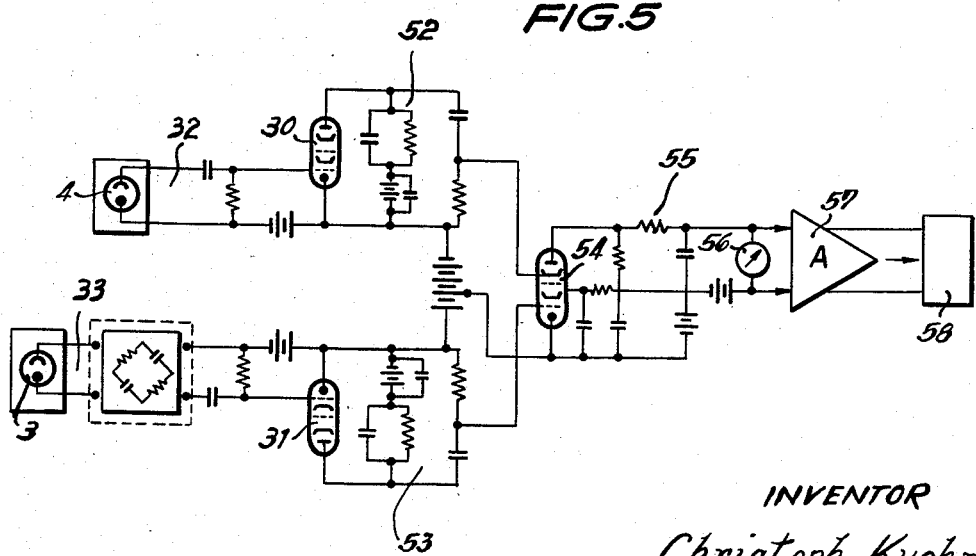

For this purpose the invention uses a scale system equivalent to that which is to be read with positional interpolation, the divisions of both scale systems being continuously scanned to produce trains of electrical impulses, and the phase difference between such trains of impulses being measured for the purpose of said positional interpolation. This will be understood more completely from the following description and from the drawing appended thereto. Figure 1 is a highly schematic view of a scale system in accordance with the invention. Figure 2 is a view taken along lines 2—2 in Figure 1, on a larger scale and with more realistic showing. Figure 3 is a detail from Figure 2, shown on still larger scale. Figure 4 is a circuit diagram, showing details of element 40 in Figure 2; and Figure 5 is a modification of Figure 4.

Referring first to Figure 1: concentric, annular, graduated, transparent circles 1 and 2, illuminated from the back as seen in this view, are movable relative to one another in the following way. Circle 1, which serves as the equivalent scale system initially mentioned, is desirably stationary while circle 2 is for instance the vertical circle of a theodolite, the use of which involves occasional or frequent, large or small, rapid or slow rotations. The divisions of both circles are subjected to a scansion by scanning devices 3 and 4, respectively, said devices being rigidly mounted on an arm 5 which rotates continuously over the movable and immovable circles on a shaft 6 coaxial with said circles. As the scanning devices pass circle divisions, electrical pulses are obtained. The timing between pulses of the two scanning devices, created in this way, provides a measure of the spacing between graduations of the two circles, underlying said devices. Whenever such graduations coincide there obtains a zero phase difference between the two trains of impulses; this condition is rare when graduations of each circle are widely spaced, and the condition cannot be expected to occur regularly even when they are closely spaced. It is for this reason that interpolation of positions is frequently required; and such interpolation is achieved, according to this invention, by measuring the phase difference between the two trains of pulses. In this way the system allows automatic measurement of the position of a theodolite circle 2 or the like, whether such position be in coincidence with a reading mark or spaced therefrom by a greater or lesser distance.

Referring now to Figure 2: it may be mentioned, first, that prior to the establishment of the position shown the theodolite circle is likely to have been rotated; and it is assumed that incident to such rotation a gross measurement of the repositioning process has already been performed, for instance by using some known device, not shown, for counting graduation marks of the theodolite circle, passing a fixed reading post. Thereafter, both circles 1 and 2 are stationary at least for a moment, while scanning means 3 and 4 continue to rotate, thereby now providing the possibility of a more precise measurement of circle position, be it by the coincidence method (zero phase difference) or by the interpolation method (positive or negative phase difference). Holder 13 of theodolite circle 2 is secured to the shaft 14 of the theodolite telescope, not shown; this shaft being hollow and coaxial with shaft 6 of the scanner arm. Suitable bearings are of course provided, for instance at 16 between shaft 14 and the frame 17 of the instrument. Said frame also serves as a holder for comparison circle 1. Desirably the two circles have graduations which are as uniform as possible, for instance by forming both graduations, with suitable radii, as photographic or equivalent copies of a master division, or by forming one as a copy of the other.

For scanning purposes arm 5 carries an illuminating device 18 below circles 1, 2 and scansion devices 3, 4 above the same. These devices are shown schematically in Figure 3. Light source 21, desirably energized through conductors 21a extending through arm 5 and shaft 6, serves to illuminate both circles 1, 2. For illuminating circle 2 it is combined with a condenser 22, diaphragm 23 and lens system 24; a reflector prism 25 being interposed between the diaphragm and the lens system. Identical means are used to illuminate circle 2. Scanner 4 has objective lens system 26 opposite illuminating lens 24, for imaging division marks of the circle in the aperture of diaphragm 27, in front of photocell 28.

As a similar scanning device is provided for the comparison circle 1, at 3, and as both scanning devices, on rigid arm 5, rotate over circles 1 and 2, both of which are temporarily stationary, a train of electrical impulses is generated in photocell 28 and a similar train in the other photocell, 29, such impulses being sent through conductors 32 and 33 respectively, which, as shown in Figure 2, extend through arm 5 and shaft 6 and to a phase comparing circuit 40, for instance the circuit of Figure 4. When such circuit determines the existence of a certain phase difference, this serves, as mentioned, as a measurement of the precise position of the theodolite circle, interpolating such measurement from relative displacements of non-coincident marks, which appear in the circuit as non-coincident impulse phases.

At this point it becomes important to note that, in order to establish high precision of interpolation, certain errors of observation and of observing tools—circles as well as scanners—must be eliminated so far as possible and, of course, as economically as possible. Although much work has been done toward such objectives, particularly in relatively recent times, much has remained to be desired and it is believed that considerable progress has now been achieved, by the relatively simple use of a complete comparison circle and rotating scansion device in lieu of the theodolite circle reading devices hitherto employed. These tools give not only the equivalent of the reading available at the usual stationary reading post. For one thing, they provide the possibility of eliminating measuring errors caused by accidental errors of the theodolite circle division itself, it being possible to base the phase comparison on average distances of pulses in each train, such average being derived for instance by integrating phase differences of a large number of marks; for instance, if desired, phase differences of all marks of the circles. Systematic errors of the circle divisions are already eliminated in substance if and as the circles employed, as mentioned, are copies of a master or of one another. Still further, centering errors, which have long been a source of much tedious extra work and extra cost in telescopes and the like, are largely eliminated, at no extra cost, by the same arrangement.

Referring next to the phase comparing circuit of Figure 4. The impulses arriving through the aforementioned conductors 32, 33 are fed respectively to thermionic tubes 30, 31, or equivalent devices. Between the plates of said tubes two resistors 34, 35 are inserted in series and a condenser 36 is in parallel therewith, as is a circuit which comprises a measuring instrument 37 in series with resistors 38, 39. Pulse durations are stretched by wave shape modulators 45, 46 between wires 32, 33 and grids of 30, 31; and the components of the circuit are so dimensioned that the tube 31 operates in the zone of critical plate potential.

As a result, nearly constant plate current is furnished by tube 31 from the instant when impulse voltage begins to build up in the output of modulator 46; and this causes nearly constant voltage across resistor 35 from this instant, and nearly constant rate of charging condenser 36 in one sense. With phase difference, these processes are repeated when the impulse form modulator 45 arrives at 30. As a net effect, condenser 36 is charged only during the interval corresponding to the phase difference of the two impulses.

Time switch 42 interrupts plate current of tubes 30, 31 when maximum plate current flows through tube 31 and when voltage has been developed across resistor 35. Condenser 36 can then discharge across resistors 37, 38, 39, whereas valves 43, 44 prevent it from discharging across resistors 34, 35. The operation of time switch 42 being cyclic, there is an average discharge, which furnishes the interpolating measurement as desired.

In the modified circuit of Figure 5, amplifier systems 52, 53 of tubes 30, 31 selectively filter the arriving pulses, passing only their fundamental oscillations. These are multiplied in mixer 54, the rectified output of which can be impressed on a direct current instrument for integration and direct indication of phase differences between pulses from devices 3 and 4. Circuit 55 connects tube 54 with such an instrument 56 and, as shown, with a magnetic amplifier 57 controlling a recorder 58. It will further be noted that phase shifting means 59 is interposed between test device 3 and tube 31, for controlling the phase of the signal arriving in 33, for instance, shifting it by 90 degrees.

Other modifications of the phase comparing system are possible. For instance, it is even possible to replace the tangible comparison circle 1 and scanner 3 thereof by a suitable impulse generator which furnishes impulses of constant phase, while it is further possible to replace the impulse generator 4 of the instrument circle 2 by modified scansion means or equivalent devices. It is however important, in accordance with the invention, that instead of the conventional reading of circle 2 at stationary posts, there is used at least the equivalent of a scanning motion covering extended portions of the circle, the position of which is to be interpolated, and that suitable cyclic impulses be generated thereby for comparison with master impulses. By this expedient the interpolation becomes independent of graduation errors of the circle or circles; that is, the accuracy of the interpolation is increased materially over such measurements of circle position as have been used hitherto, with or without micrometers and the like.

This can be explained further by expressing the accuracy of interpolation in terms of the angle $\Delta\phi$ of photo-electrical maintenance of phase difference zero, which angle equals $$\delta \frac{360}{n}$$

when $n$ is the number of graduation intervals of the entire circle 2 and $\delta$ is the relative precision of the phase comparing circuit over period $2\pi$. The number of said intervals is limited, as known, as the graduations must be capable of resolution, be it optically, magnetically or otherwise. Optimum conditions exist when intervals are approximately twice as wide as are the graduations of minimum, resolvable width, capable of observation by the scanning system.

Under such optimum conditions the accuracy of interpolation or angle $\Delta\delta$ equal $2s\delta/R$ when $s$ is the width of graduations and R the scanning radius. In practice, it is possible to resolve down to a few hundredths of a second of arc; subject to the understanding that the number of graduations, $n$, which equals $360/2Rs$, must be an integer divisible by 360 or an integral multiple thereof, where the graduation is sexagesimal, and that the utilisation of available resolution is limited as a result. This latter limitation, however, can be eliminated by provision of a plurality of scansion systems arranged in nonius fashion or, more generally, so as to divide fundamental scanning intervals of a main scanner into equal parts.

Under actual conditions, as distinguished from this optimum, the accuracy of interpolation tends to be further reduced by errors of graduation of the circle or circles involved, it being known that such errors are either accidental or systematic; the latter being mainly caused by so-called periodic errors of the machine or system used in making the circle, or in making the master from which the circle is copied. The accidental error tends to cause accidental variations of impulse distances about some average for each complete circle or major portion thereof. These variations have been eliminated by the present invention, particularly by the use of averaging scansion, which can further be supplemented by well-known means for elimination of residual, generally systematic variations, for instance by the selective filtering system which has been described in connection with Figure 5 and which passes only fundamental impulse frequencies, as distinguished from the harmonic equivalents of superimposed signal waves.

Circle 2, as mentioned, may be graduated by visible, magnetic or other marks, which may be provided for instance by conventional lines but also by laminations of staggered layers of material of different magnetic or other permeability, on the carrier body. Finally it may be mentioned that, instead of theodolites, a great variety of other instruments, requiring angular readings, may utilize the apparatus provided by the invention; such instruments may for instance be used even for the fabrication of new circles, with the aid of a scanning system 3, 4, 5 and a pair of circles 1, 2 which in that case may both be considered as master circles.

I claim:

1. Apparatus for interpolating variable positions of an instrument scale, for instance positions of a theodolite circle, comprising: an additional scale, generally similar to the instrument scale but normally stationary, said additional scale being coaxial with the instrument scale; a scanning unit overlying both scales; means for continuously rotating said unit about the common axis of said scales; first and second scale response means in said unit, for deriving from the two scales, respectively, a first and a second sequence of electrical impulses, incident to said rotating of the unit; and electrical circuit means receiving said impulses and arranged to measure a phase difference between said sequences of impulses, when such a difference exists upon variation of the position of the instrument scale from coincidence with the additional scale, and thereby to interpolate the position established by such variation.

2. Apparatus as described in claim 1 wherein both scales are in substance photographic copies of a master scale.

3. Apparatus as described in claim 1 wherein said circuit means include a circuit adapted to average the frequencies of impulses of both sequences, thereby substantially eliminating errors of said scales.

4. Apparatus as described in claim 1 additionally including means for selectively filtering the impulse sequences received in said circuit means to filter out harmonics of said frequencies.

References Cited in the file of this patent
UNITED STATES PATENTS

| | | |
|---|---|---|
| 2,375,665 | Koulicovitch | May 8, 1945 |
| 2,462,925 | Varian | Mar. 1, 1949 |
| 2,576,758 | Jones | Nov. 27, 1951 |
| 2,693,991 | Holtz | Nov. 9, 1954 |